(12) United States Patent
Ujimoto et al.

(10) Patent No.: US 9,032,829 B2
(45) Date of Patent: May 19, 2015

(54) BUTTON STRUCTURE OF SHIFT KNOB

(71) Applicant: DELTA KOGYO CO., LTD., Hiroshima (JP)

(72) Inventors: Takushi Ujimoto, Hiroshima (JP); Mizuho Ueta, Hiroshima (JP); Koichiro Hamaka, Hiroshima (JP); Takumi Kusayama, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 14/069,945

(22) Filed: Nov. 1, 2013

(65) Prior Publication Data

US 2014/0137684 A1 May 22, 2014

(30) Foreign Application Priority Data

Nov. 16, 2012 (JP) ................. 2012-252462

(51) Int. Cl.
  *B60K 20/02* (2006.01)
  *F16H 59/10* (2006.01)
  *F16H 59/02* (2006.01)
  (Continued)

(52) U.S. Cl.
  CPC ........... *F16H 59/10* (2013.01); *Y10T 74/20098* (2015.01); *F16H 59/0278* (2013.01); *F16H 61/18* (2013.01); *F16H 61/22* (2013.01); *F16H 2059/0282* (2013.01)

(58) Field of Classification Search
  CPC ..... B60K 20/04; F16H 59/0278; F16H 61/16; F16H 61/18; F16H 59/02; F16H 61/22; G05G 1/06; G05G 2009/04774; G05G 9/047; E02F 9/2004
  USPC ............................................... 74/469–473.35
  See application file for complete search history.

(56) References Cited

U.S. PATENT DOCUMENTS

| | | | |
|---|---|---|---|
| 1,862,098 A | * | 6/1932 | Sheldrick ................... 74/473.34 |
| 5,617,760 A | | 4/1997 | Woeste et al. |
| 5,957,001 A | * | 9/1999 | Gualtieri et al. ........... 74/473.12 |

(Continued)

FOREIGN PATENT DOCUMENTS

| | | |
|---|---|---|
| DE | 195 13 809 | 10/1996 |
| DE | 200 03 438 | 6/2000 |

(Continued)

OTHER PUBLICATIONS

English translation of DE20003438 (U1).*

*Primary Examiner* — William Kelleher
(74) *Attorney, Agent, or Firm* — Gerald E. Hespos; Michael J. Porco; Matthew T. Hespos (57) ABSTRACT

Provided is a button structure of a shift knob for use with a shift lever in which a rod is provided. The shift knob comprises: a button capable of being pushed to allow the rod to be moved downwardly from a lock position to a lock release position; a pinion gear provided in coaxial relation to a pivot shaft of the button; and a rack meshed with the pinion gear. The button structure moves the rod to a shift-lock release position, interlockingly with a downward movement of the rack caused by a swinging movement of the pinion gear in a forward direction, according to a pushing operation of the button, and moves the rod to a shift-lock position, interlockingly with an upward movement of the rack caused by a swinging movement of the pinion gear in a reverse direction, according to a push-mode releasing operation of the button.

3 Claims, 11 Drawing Sheets

(51) Int. Cl.
*F16H 61/18* (2006.01)
*F16H 61/22* (2006.01)

(56) References Cited

U.S. PATENT DOCUMENTS

| | | | | |
|---|---|---|---|---|
| 6,145,401 | A * | 11/2000 | Brush et al. | 74/473.12 |
| 6,892,481 | B2 * | 5/2005 | Yamamoto et al. | 37/348 |
| 7,272,988 | B2 * | 9/2007 | Meyer et al. | 74/473.3 |
| 7,430,940 | B2 * | 10/2008 | Kondou et al. | 74/537 |
| 7,779,719 | B2 * | 8/2010 | Chiang | 74/502.2 |
| 8,468,906 | B2 * | 6/2013 | Shioji et al. | 74/473.3 |
| 2003/0094066 | A1 | 5/2003 | Blascok et al. | |
| 2006/0070482 | A1 * | 4/2006 | Steele | 74/523 |
| 2007/0137406 | A1 * | 6/2007 | Tucker et al. | 74/543 |
| 2011/0126656 | A1 * | 6/2011 | Na et al. | 74/473.3 |

FOREIGN PATENT DOCUMENTS

| | | | | |
|---|---|---|---|---|
| DE | 10159642 A1 * | 6/2003 | | B60K 20/02 |
| DE | 20 2008 010 061 | 11/2008 | | |
| JP | 5-1552 | 1/1993 | | |

* cited by examiner

BUTTON STRUCTURE OF SHIFT KNOB

BACKGROUND OF THE INVENTION

1. Field of the Invention

The present invention relates to a button structure of a shift knob.

2. Background Art

Figure 11:
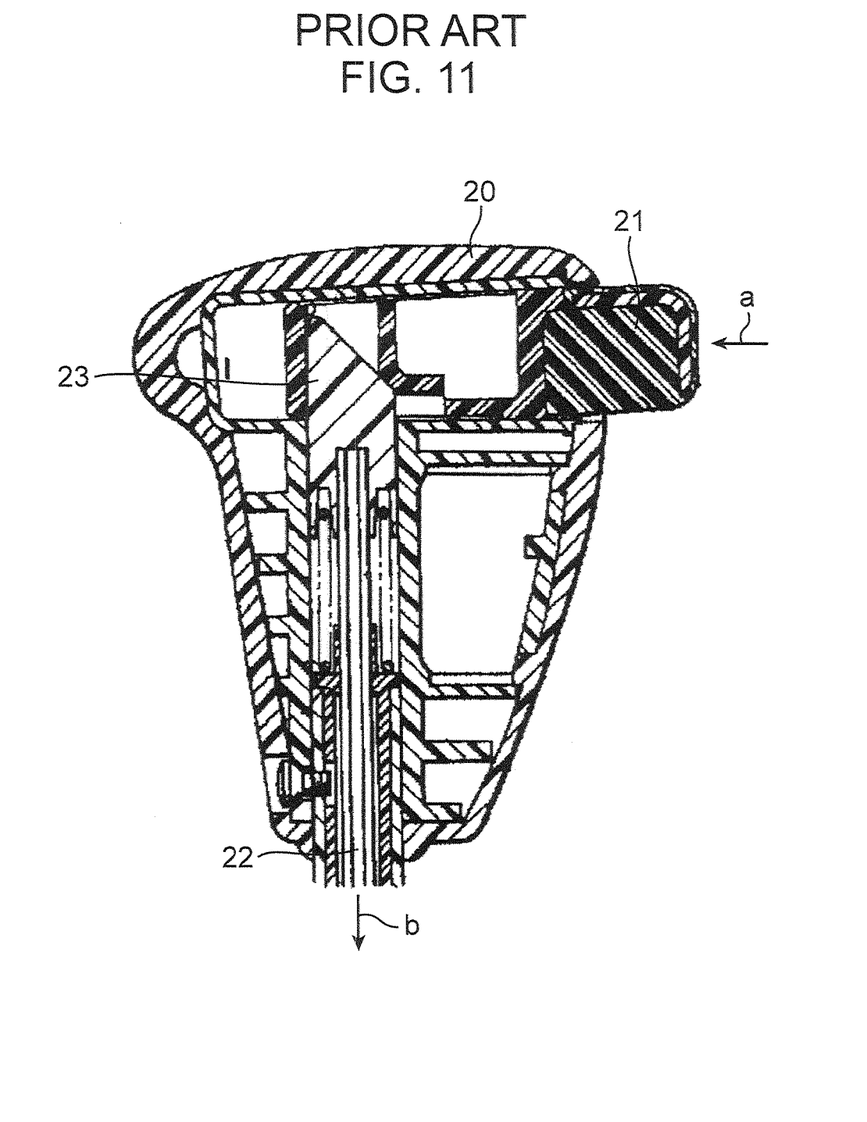
FIG. 11 is a sectional view of a conventional button structure of a shift knob.

Heretofore, an automobile transmission shift lever device has been known as disclosed, for example, in JP-U 05-001552A. As illustrated in FIG. 11, this type of shift lever device is configured such that, when a button 21 of a shift knob 20 is manually pushed (see the arrowed line a in FIG. 11) and set to a push mode (pushing operation), a rod 22 is moved to a shift-lock release position (see the arrowed line b in FIG. 11). Then, when the button 21 of the shift knob 20 is manually released from the push mode (push-mode releasing operation), the rod is moved to a shift-lock position.

In a button structure for the shift lever device disclosed in the JP-U 05-001552A, according to the pushing operation of the button 21, a slide cam 23 having an inclined contact surface is pressed downwardly, and thereby the rod 22 is moved downwardly to the shift-lock release position.

This button structure is configured such that the slide cam 23 is slidingly moved with respect to the button 21, which causes an increase in transmission loss of load from the pushing operation of the button to the slide cam 23. Thus, the pushing operation of the button is liable to become heavy and awkward.

SUMMARY OF THE INVENTION

It is an object of the present invention to provide a button structure of a shift knob, capable of allowing a pushing operation of a button to be performed lightly and smoothly, thereby reducing operational burden on an operator or driver.

According to one aspect of the present invention, there is provided a button structure of a shift knob for use with a shift lever in which a rod is provided in an upwardly and downwardly movable manner. The button structure is characterized in that the shift knob comprises: a button capable of being manually pushed while being supported in a swingable manner, to allow the rod to be moved downwardly from a lock position to a lock release position; a pinion gear provided in coaxial relation to a pivot shaft of the button; and a rack meshed with the pinion gear, wherein the button structure is configured to move the rod to a shift-lock release position, interlockingly with a downward movement of the rack caused by a swinging movement of the pinion gear in a forward direction, according to a pushing operation of the button, and to move the rod to a shift-lock position, interlockingly with an upward movement of the rack caused by a swinging movement of the pinion gear in a reverse direction, according to a push-mode releasing operation of the button.

DETAILED DESCRIPTION OF THE PREFERRED EMBODIMENTS OF THE INVENTION

The present invention will now be described in detail, based on an embodiment thereof with reference to the drawings.

Firstly, with reference to FIGS. 1 to 4B, a shift knob 1, primarily, a button structure thereof, in a shift knob installation structure according to one embodiment of the present invention, will be described.

Figure 1:
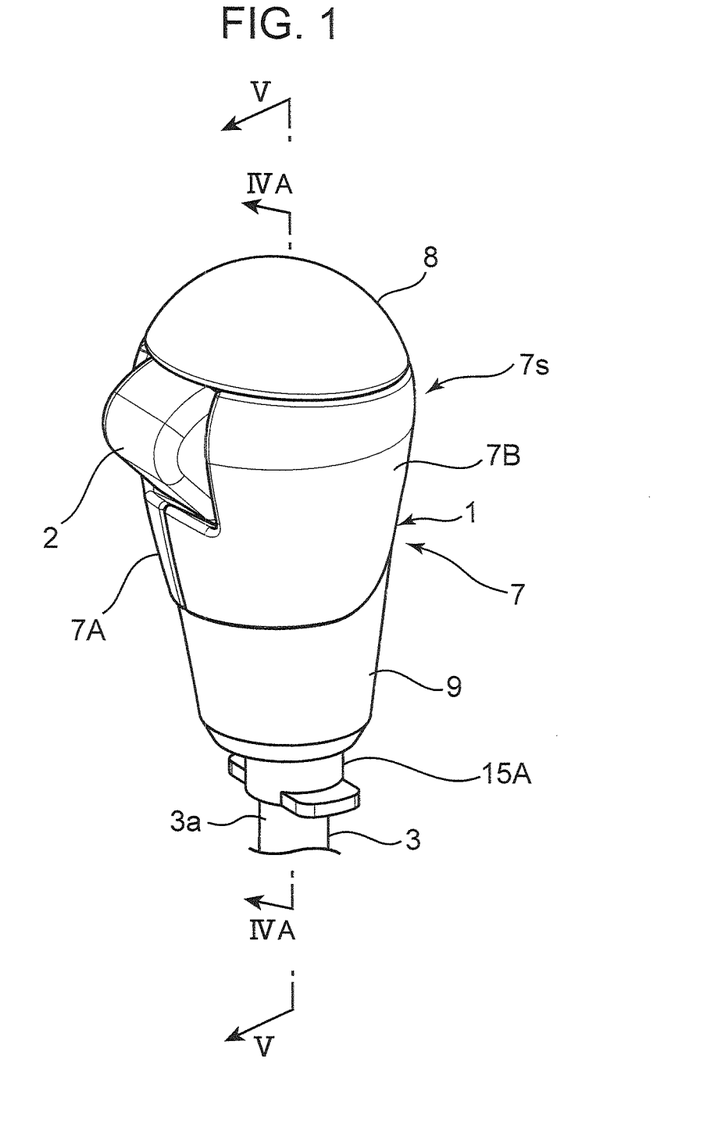
FIG. 1 is a perspective view of a shift knob in a shift knob installation structure according to one embodiment of the present invention.
Figure 2:
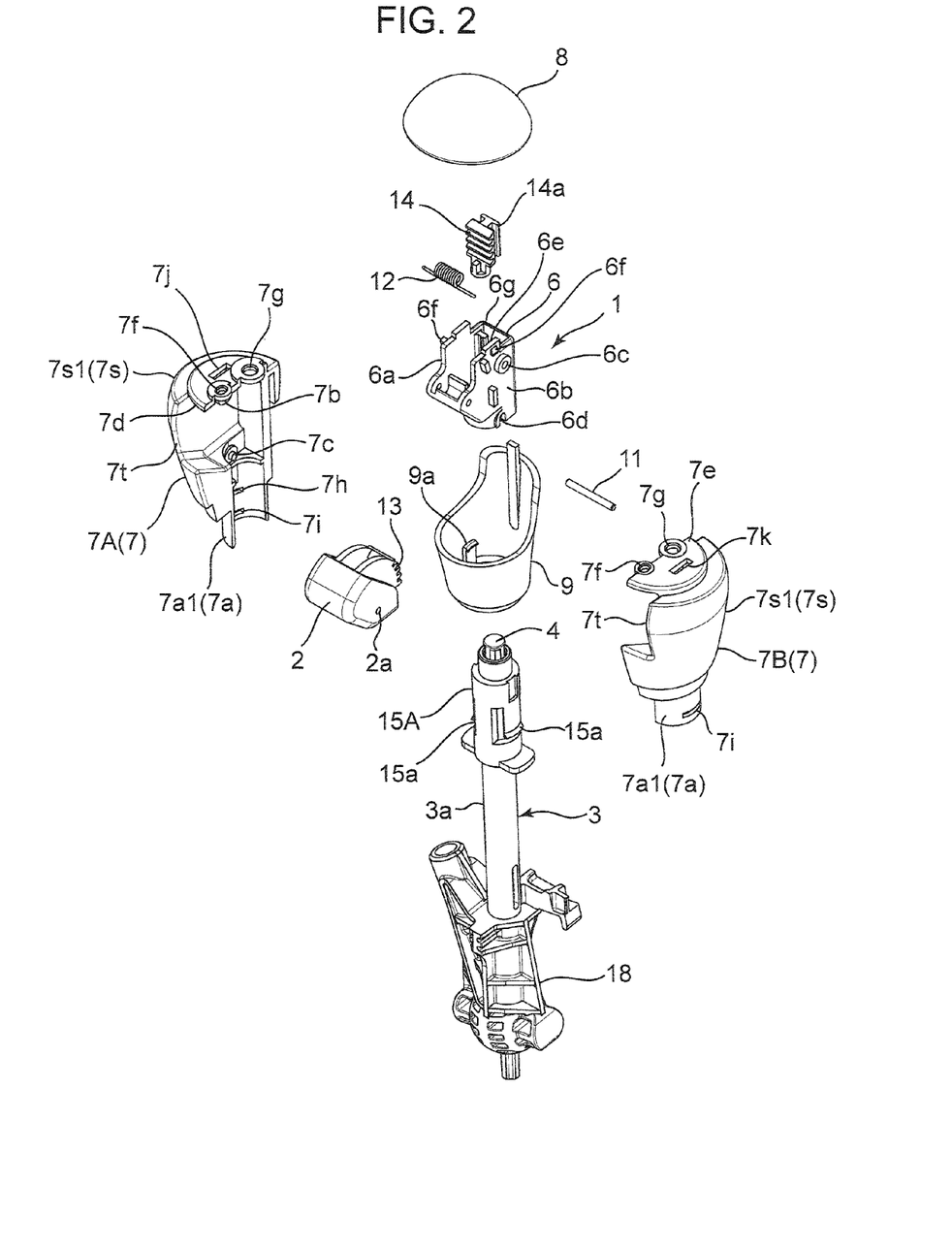
FIG. 2 is an exploded perspective view of the shift knob illustrated in FIG. 1.
Figure 3A:
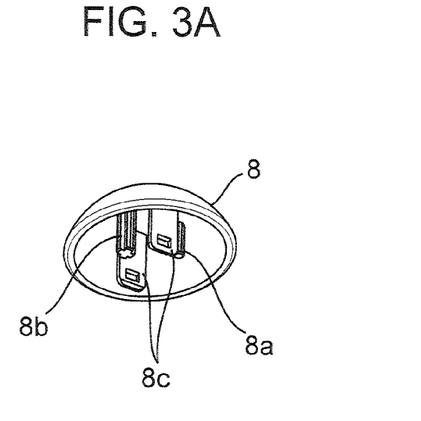
FIGS. 3A and 3B are perspective views of an ornament.
Figure 3B:
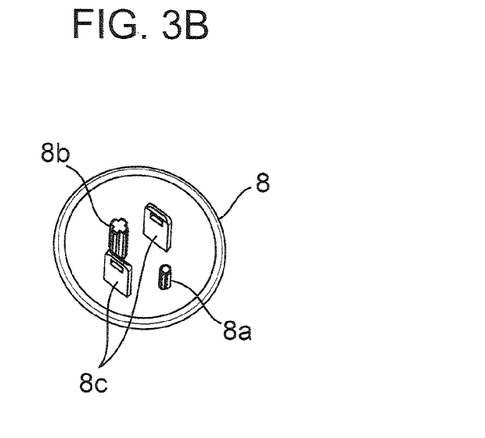
Figure 3C:
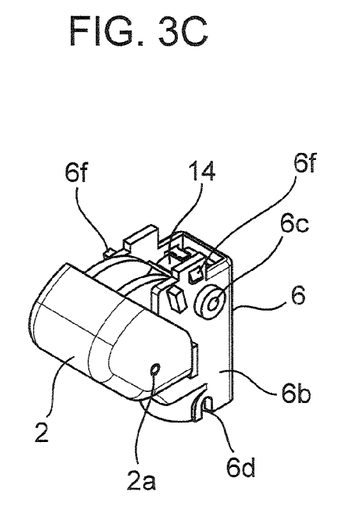
FIGS. 3C and 3D are perspective views of a button base.
Figure 3D:
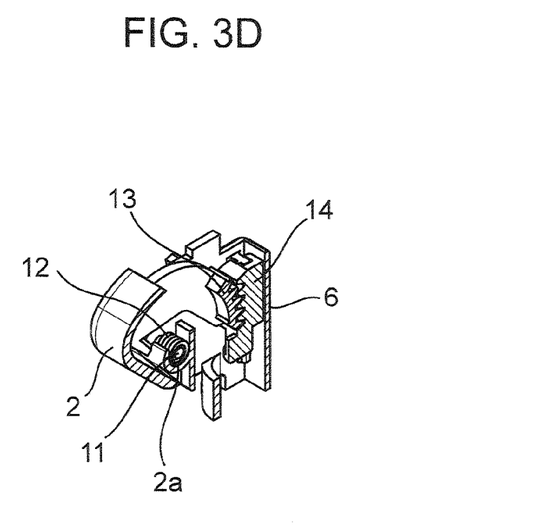
Figure 4A:
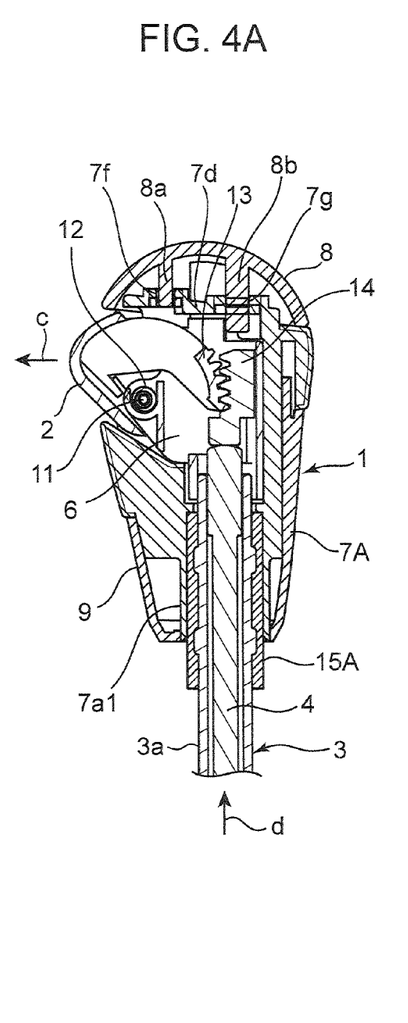
FIG. 4A is a sectional view of the shift knob, taken along the line IVA-IVA in FIG. 1, in a state when a button of the shift knob is in a push-mode release position.
Figure 4B:
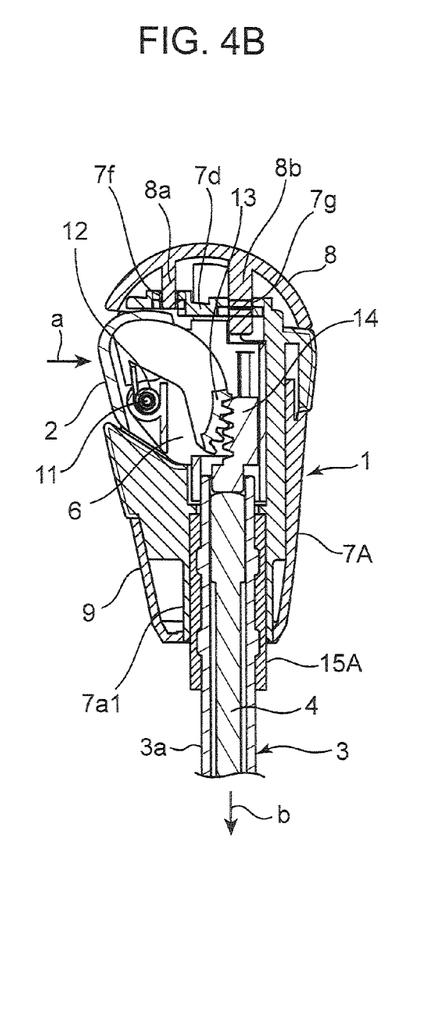
FIG. 4B is a sectional view of the shift knob, corresponding to FIG. 4A, in a state when the button is in a push-mode position.
Figure 5:
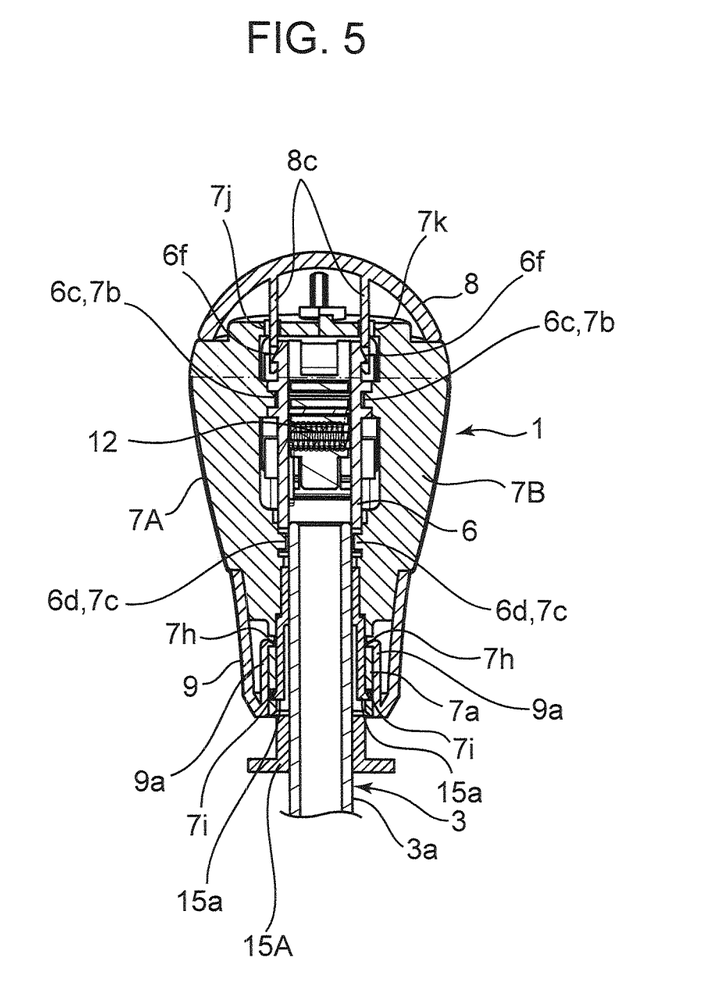
FIG. 5 is a sectional view of the shift knob, taken along the line V-V in FIG. 1.

FIG. 1 is a perspective view of the shift knob 1. FIG. 2 is an exploded perspective view of the shift knob 1. FIGS. 3A and 3B are perspective views of an ornament 8. FIGS. 3C and 3D are perspective views of a button base 6. FIG. 4A is a sectional view of the shift knob 1 in a state when a button 2 thereof is in a push-mode release position. FIG. 4B is a sectional view of the shift knob 1 in a state when the button 2 is in a push-mode position. FIG. 5 is a front sectional view of the shift knob.

A shift lever 3 is, for example, an automobile transmission shift lever. As illustrated in FIGS. 4A and 4B, a shift lever device using the shift lever 3 is configured such that, according to when the button 2 of the shift knob 1 is manually pushed and set to a push mode (a pushing operation in a direction indicated by the arrowed line a in FIG. 4B), a rod 4 held inside a shift shaft 3a of the shift lever 3 in an upwardly and downwardly movable manner is moved downwardly as indicated by the arrowed line b. Through this operation, the rod 4 is set to a shift-lock release position. Then, when the button 2 of the shift knob 1 is manually released from the push mode and moved in a direction as indicated by the arrowed line c in FIG. 4A (a push-mode releasing operation), the rod 4 is moved upwardly as indicated by the arrowed line d in FIG. A, and returned to its initial position. Through the above push release operation, the rod 4 is set to a shift-lock position.

The shift knob 1 comprises: a button base 6; a core 7 comprised of a pair of left and right half-cores 7A, 7B made of a synthetic resin and the half-cores 7A, 7B being assembled (joined) together while clamping the button base 6 from opposed lateral directions, thereby installing the button base 6 in the core 7; and an ornament (decorative member) 8 made of a synthetic resin and attached to an upper side of the core 7 (i.e. the assembled half-cores 7A, 7B) to cover the upper side of the core 7. The shift knob 1 further comprises a cover ring 9, made of a synthetic resin, attached to lower tubular portion 7a of the core 7 to cover the lower tubular portion 7a. Each of the half-cores 7A, 7B (first half-core 7A and second half-core 7B) has the lower semi-tubular portion 7a1, and a semi-bulging portion 7s1 connecting to an upper edge of the lower semi-tubular portion 7a and having a shape bulging outwardly with respect to the lower semi-tubular portion 7a1. The pair of the lower semi-tubular portion 7a1, 7a1 forms the lower tubular portion 7a. The pair of semi-bulging portion 7s1, 7s1 forms a bulging portion 7s.

The button base 6 has two sidewalls 6a, 6b arranged in parallel relation to each other, and a connection wall 6g connecting the sidewalls 6a, 6b together. Each of the sidewalls 6a, 6b supports a respective one of opposite ends of a pivot shaft 11 penetrating through a pivot-shaft receiving hole 2a of the button 2. The pivot shaft 11 is provided with a coil spring 12 wound therearound to bias the button 2 in a push-mode releasing direction. It is to be understood that the button 2 may be biased in a pushing direction, instead of being biased in the push-mode releasing direction as in this embodiment.

Further, for example, the sidewalls 6a, 6b of the button base 6 may be integrally molded with a pair of pivot-protrusion receiving holes, respectively. In this case, the button 2 may have a pair of pivot protrusions each formed on a respective one of opposite side surfaces thereof in such a manner as to be fittable into a respective one of the pivot-protrusion receiving holes of the button base 6, through an integral molding process. Then, each of the pivot protrusions of the button 2 is fitted into a respective one of the pivot-protrusion receiving holes of the button base 6, while bending each of the sidewalls 6a, 6b of the button base 6 outwardly, so that the button 2 is rotatably supported by the button base 6. This makes it possible to omit the pivot shaft 11. Further, the button base 6 may be integrally molded with an elastic piece for biasing the button 2 in the push-mode releasing direction or in the pushing direction. This makes it possible to omit the coil spring 12.

The button 2 has a multi-tooth (in this embodiment, 5-tooth) pinion gear 13 formed on an end thereof opposite to a side to be manually pushed, in coaxial relation to the pivot shaft 11, through an integral molding process. Alternatively, the pinion gear 13 may be formed as a separate component from the button 2. That is, in the case where a button 2 is designed while attaching importance to aesthetics, a pinion gear 13 formed separately from the button 2 while attaching importance to strength may be fixed to the button 2.

The button base 6 is provided with a guide groove 6e extending in an up-down direction. The guide groove 6e is configured to allow a convex portion 14a of a rack 14 to be fitted thereinto. The rack 14 meshed with the pinion gear 13 is supported by the guide groove 6e in an upwardly and downwardly movable manner. That is, the rack 14 is supported by the button base 6. A lower end of the rack 14 is in contact with an upper end of the rod 4.

The button 2, the pivot shaft 11, the coil spring 12 and the rack 14 are preliminarily assembled to the button base 6.

The core 7 is provided with a cutout 7t for allowing the button 2 to penetrate therethrough. Although the button 2 is installed in the core 7, a part of the button 2 is exposed to the outside through the cutout 7t.

Each of the pair of generally semi-cylindrical shaped half-cores 7A, 7B has an upper protrusion 7b and a lower protrusion 7c formed on an inner surface thereof (see FIG. 5). The upper protrusion 7b and the lower protrusion 7c are fitted, respectively, into an upper hole 6c and a lower hole 6d of a corresponding one of the sidewalls 6a, 6b of the button base 6, from a lateral direction. Further, each of a pair of top half-walls 7d, 7e of the half-cores 7A, 7B is formed with two insertion holes 7f, 7g.

Thus, when the pair of half-cores 7A, 7B are joined together from opposed lateral directions, each of two sets of the upper protrusion 7b and the lower protrusion 7c is fitted into a corresponding one of two sets of the upper hole 6c and the lower hole 6d of the button base 6. Therefore, when the button base 6 is clamped from opposed lateral directions by the pair of half-cores 7A, 7B, the button base 6 is installed in and held by the core 7 while being fixed at a given position within the core 7.

Further, when the pair of half-cores 7A, 7B are assembled together, a part of the top half-wall 7e of the right half-core 7B gets into under a part of the top half-wall 7d of the left half-core 7A, in such a manner as to allow each of the insertion holes 7f, 7g of the top half-wall 7d to be aligned with a respective one of the insertion holes 7f, 7g of the top half-wall 7e in an up-down direction.

As mentioned above, each of the half-cores 7A, 7B is formed with the lower semi-tubular portion 7a1 shaped in a semi-cylindrical shape. In the state in which the pair of half-cores 7A, 7B are joined together from opposed lateral directions, the lower semi-tubular portions 7a1, 7a1 of the half-cores 7A, 7B are assembled into a lower tubular portion 7a having a circular tubular shape. A plurality of sets of upper and lower, two, locking recesses (locking holes) 7h, 7i are formed in the lower tubular portion 7a, at approximately even angular intervals (in this embodiment, at intervals of 180 degrees) in a circumferential direction, and in a symmetrical manner with respect to an axis of the lower tubular portion 7a. The core is not necessarily formed in the pair of generally semi-cylindrical shaped half-cores 7A, 7B to be joined together from opposed lateral directions, but may be formed in an integrated cylindrical core.

The ornament 8 is formed in an upwardly-convexed generally hemispherical (arc face-like) shape, and two insertion shafts 8a, 8b are formed on a lower surface thereof. Each of the insertion shafts 8a, 8b is configured, when the ornament 8 is put on the top half-walls 7d, 7e of the core 7 in a state that the half-cores 7A, 7B are joined from opposed lateral directions, to be aligned with a corresponding one of the aligned insertion holes 7f, 7g, in an up-down direction. In this way, the insertion shafts 8a, 8b are inserted, respectively, into the aligned insertion holes 7*f*, 7*g*, so that the top half-walls 7*d*, 7*e* of the pair of half-cores 7A, 7B are retained in an inseparable manner.

The ornament 8 also has two insertion pawls 8*c* formed on the lower surface thereof in such a manner as to be insertable, respectively, into two slits 7*j*, 7*k* of the core 7. Then, each of the insertion pawls 8*c* is locked by a respective one of a pair of protrusions 6*f* formed, respectively, on the sidewalls 6*a*, 6*b* of the button base 6, so that the ornament 8 is attached to the core 7 while covering over the upper side of the core 7. In this operation, a coupling between corresponding ones of the insertion pawls 8*c* and the protrusions 6*f* is achieved in a snap fit manner. The snap fit means one type of mechanical joining technique for use in coupling between metal or plastic members, and a technique of fittingly coupling two members together by means of an elastic force of a material, thereby achieving fixing therebetween.

The cover ring 9 is formed in a generally cylindrical shape, and a pair of lockable protrusions 9*a* are formed on an inner surface thereof in such a manner as to be lockable, respectively, to the two upper locking recesses 7*h* of the lower semi-tubular portions 7*a*1 of the half-cores 7A, 7B assembled into a cylindrical shape. Each of the lockable protrusions 9*a* extends upwardly from a bottom wall of the cover ring 9, and has a pawl formed an upper end thereof to protrude in a lateral direction. A coupling of each of the lockable protrusion 9*a* to a corresponding one of the locking recess 7*h* is achieved in a snap fit manner. Thus, when the cover ring 9 is fitted onto an outer periphery of the lower tubular portion 7*a* of the core 7 from therebelow, each of the lockable protrusions 9*a* is locked by a respective one of the locking recesses 7*h*. In this way, the cover ring 9 is attached to the core 7 while covering the lower tubular portion 7*a* of the core 7.

The shift shaft 3*a* of the shift lever 3 is made of a metal, and a synthetic resin sleeve 15A is integrally formed on an outer periphery of an upper portion of the shift shaft 3*a* by an outsert molding process. The sleeve 15A is formed with a pair of lockable protrusions 15*a* lockable, respectively, to the two lower locking recesses 7*i* of the lower semi-tubular portions 7*a*1 of the half-cores 7A, 7B assembled into a cylindrical shape. Each of the lockable protrusions 15*a* extends downwardly, and has a pawl formed a lower end thereof to protrude in a lateral direction. A coupling of each of the lockable protrusions 15*a* to a corresponding one of the locking recesses 7*i* is achieved in a snap fit manner. Thus, when the shift shaft 3*a* of the shift lever 3 is inserted into an inside of the lower tubular portion 7*a* of the core 7 from therebelow, each of the lockable protrusions 15*a* is locked by a respective one of the locking recesses 7*i*. In this way, the lower tubular portion 7*a* of the core 7 is attached to the shift shaft 3*a* of the shift lever 3. It is to be understood that each of the upper and lower locking recesses 7*h*, 7*i*, the lockable protrusion 9*a* of the cover ring 9 and the lockable protrusion 15*a* of the shift shaft 3*a* is not limited to the above configuration in which two elements are provided at intervals of 180 degrees. For example, three elements may be provided at intervals of 120 degrees, or four or more elements may be provided at given intervals.

When the lower tubular portion 7*a* of the core 7 is attached to the shift shaft 3*a* of the shift lever 3 in the above manner, the lower end of the rack 14 of the button base 6 is brought into contact with the upper end of the rod 4 held inside the shift shaft 3*a* of the shift lever 3.

In the above button structure of the shift knob 1, according to a pushing operation of the button 2, the button is swingably moved, and thereby the pinion gear 13 is swingably moved (rotated) in a forward direction. Accordingly, the rack 14 interlocking with the movement of the pinion gear 13 is moved downwardly, and thus the rod 4 is moved downwardly to the shift-lock release position. Thus, a force during the pushing operation of the button 2 is transmitted to the rod 4 via the pinion gear 13 and the rack 14, so that it becomes possible to reduce a transmission loss of load from the pushing operation of the button 2. This allows the pushing operation of the button 2 to be performed lightly and smoothly. Therefore, operational burden on an operator or driver can be reduced.

On the other hand, when the button 2 is subjected to the push-mode releasing operation, the pinion 13 is swingably moved in a reverse direction. Thus, the rod 4 is moved upwardly from the shift-lock release position to the initial shift-lock position. In conjunction therewith, the rack 14 is moved upwardly. Thus, the button 2 is returned to the initial position.

In the above button structure of the shift knob 1, the button 2 with the pinion gear 13, the pivot shaft 11, the coil spring 12 and the rack 14 can be preliminarily installed in the button base 6 and adjusted, and this pre-installed unit can be simply installed in the core 7 of the shift knob 1, so that it becomes possible to enhance installation performance.

The pair of half-cores 7A, 7B are assembled together while clamping the button base 6 from opposed lateral directions, to install the button base 6 inside the core 7, and then the ornament 8 is attached to the upper side of the core 7 from thereabove. A coupling during the attachment is achieved in a snap fit manner. Then, the cover ring 9 is attached to the lower tubular portion 7*a* of the core 7 to cover the lower tubular portion 7*a*. A coupling during the attachment is also achieved in a snap fit manner. Subsequently, the lower tubular portion 7*a* of the core 7 is attached to the shift shaft 3*a* of the shift lever 3. A coupling during the attachment is achieved in a snap fit manner. In this way, an installation process for the shift knob 1 can be performed. As above, the shift knob 1 can be installed in a one-touch manner by an installation operation to be performed from one direction (up-down direction), so that it becomes possible to enhance the installation performance.

With reference to FIGS. 6A to 6D and FIGS. 7A and 7B, an installation structure for the shift knob 1, according to one embodiment of the present invention, will be primarily described.

FIGS. 6A to 6D and FIGS. 7A and 7B illustrate a push type structure according to one embodiment of the present invention. A fundamental structure of this embodiment has been described in connection with FIGS. 1 to 5, and therefore functions and advantages thereof will be additionally described here.

Figure 6A:
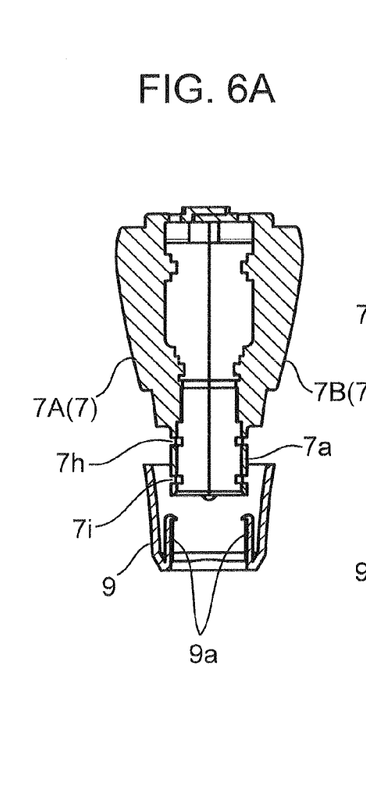
FIG. 6A illustrates a shift knob and a cover ring in a push type structure according to one embodiment of the present invention, in a state before the cover ring is attached to a lower tubular portion of a core.
Figure 6B:
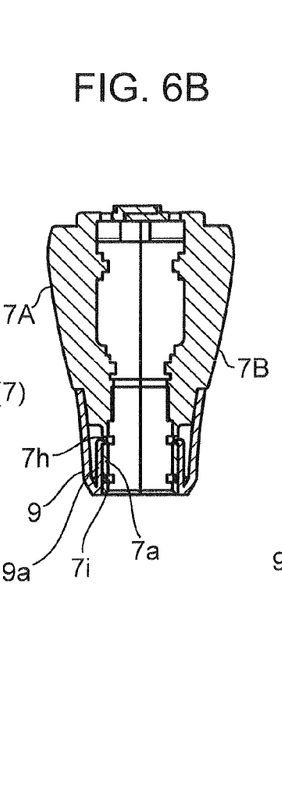
FIG. 6B illustrates the shift knob and the cover ring in the push type structure, in a state just after the cover ring is attached to the lower tubular portion of the core.
Figure 6C:
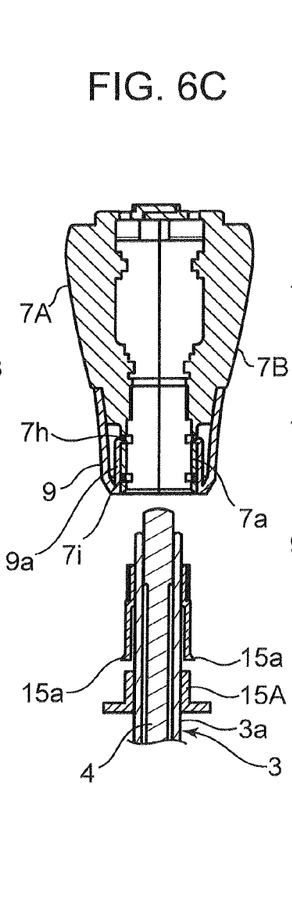
FIG. 6C illustrates a shift lever, the shift knob and the cover ring in the push type structure, in a state before the shift shaft of the shift lever is inserted into the lower tubular portion of the core.
Figure 6D:
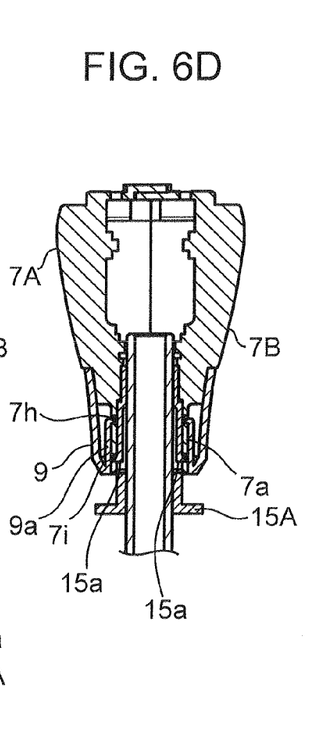
FIG. 6D illustrates the shift lever, the shift knob and the cover ring in the push type structure, in a state after the shift shaft of the shift lever is inserted into the lower tubular portion of the core.
Figure 7A:
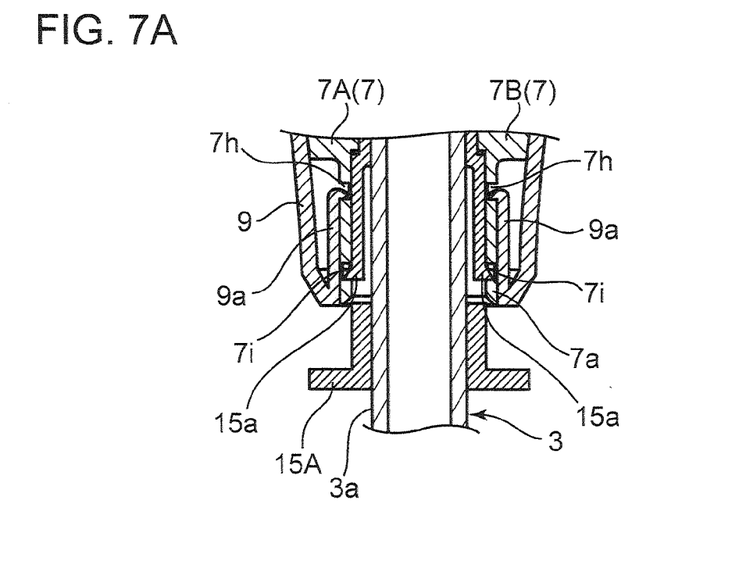
FIG. 7A is a fragmentary enlarged view of the structure in FIG. 6D.
Figure 7B:
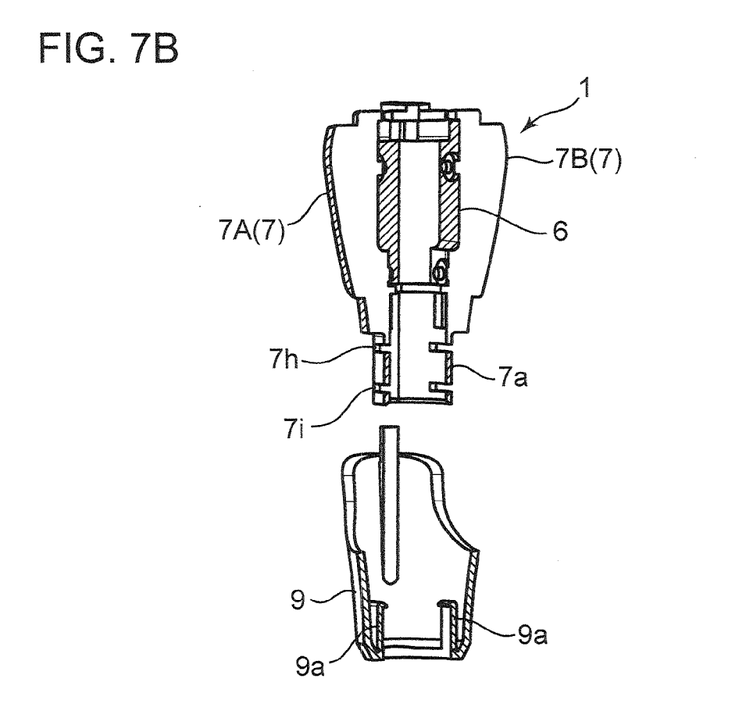
FIG. 7B is an exploded perspective sectional view of the shift knob and the cover ring in the push type structure.

FIG. 6A is a sectional view of the core 7 and the cover ring 9 in a state before the cover ring 9 is fitted onto the lower tubular portion 7*a* of the core 7. FIG. 6B is a sectional view of the core 7 and the cover ring 9 in a state just after the cover ring 9 is fitted onto the lower tubular portion 7*a* of the core 7. FIG. 6C is a sectional view of the shift shaft 3*a*, the core 7 and the cover ring 9 in a state before the shift shaft 3*a* of the shift lever 3 is inserted into the lower tubular portion 7*a* of the core 7. FIG. 6D is a sectional view of the shift shaft 3*a*, the core 7 and the cover ring 9 in a state just after the shift shaft 3*a* of the shift lever 3 is inserted into the lower tubular portion 7*a* of the core 7. FIG. 7A is a fragmentary enlarged view of the structure in FIG. 6D, and FIG. 7B is an exploded perspective sectional view of the shift knob 1 and the cover ring 9.

The shift knob 1 comprises the core 7 installing therein the button 2, and the cover ring 9 for covering the lower tubular portion 7*a* of the core 7. When the cover ring 9 is attached to the outer periphery of the lower tubular portion 7*a* of the core 7, the lockable protrusions 9a are locked, respectively, by the upper locking recesses 7h of the lower tubular portion 7a of the core 7, and thereby locked by the core 7. A coupling during this operation is achieved in a snap fit manner. Further, when the shift shaft 3a of the shift lever 3 is fitted into an inner periphery of the lower tubular portion 7a of the core 7 from therebelow, the lockable protrusions 15a of the sleeve 15A are locked, respectively, by the lower recesses 7i of the lower tubular portion 7a of the core 7, and thereby locked by the core 7. A coupling during this operation is achieved in a snap fit manner.

In this structure, when the cover ring 9 is fitted onto the outer periphery of the lower tubular portion 7a of the core 7 from therebelow, it is locked by the lower tubular portion 7a. Further, when the shift lever 3 is fitted into the inner periphery of the lower tubular portion 7a of the core 7 from therebelow, it is locked by the lower tubular portion 7a. Thus, the fitting operations are performed from one direction (up-down direction), and the coupling is achieved in a one-touch manner. That is, a shift knob installation process can be performed in such a manner that a coupling is automatically achieved only by a fitting operation without any other operation, so that it becomes possible to reduce a process time.

Further, the number of components can also be reduced, because it is possible to eliminate a need for a separate component, such as a pin, for attaching the shift knob 1 to the shift shaft 3a of the shift lever 3. In the push type structure illustrated in FIGS. 6A to 7B, the synthetic resin sleeve 15A is integrally formed on the outer periphery of the upper portion of the metal shift shaft 3a of the shift lever 3 by an outsert molding process. Thus, the lockable protrusions 15a can be provided on the shift shaft 3a. This gives rise to a question "Is it impossible to reduce the number of components (due to the sleeve 15A with pawls)?" However, the shift shaft 3a of the shift lever 3 is integrally formed with a synthetic resin support portion 18 (see FIG. 2) by an outsert molding process. The support portion 18 also serves as a swingable portion when the shift lever 3 is manually moved in front-rear and right-left directions. Therefore, by utilizing a step of outsert-molding the support portion 18, the synthetic resin sleeve 15A may be integrally outsert-molded in a simultaneous manner. This makes it possible to reduce the number of components.

FIGS. 8A to 10 illustrate a pull type structure according to one embodiment of the present invention. A fundamental structure of this embodiment has been described in connection with FIGS. 1 to 5, and therefore a different feature and functions and advantages thereof will be additionally described here.

Figure 8A:
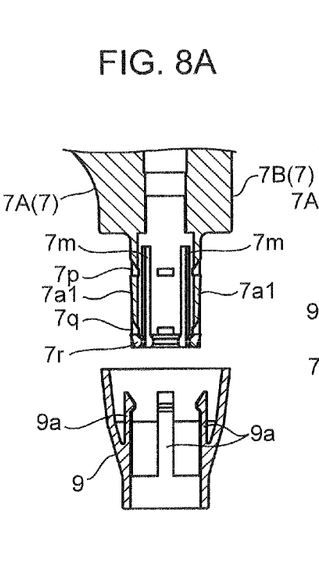
FIG. 8A illustrates a shift knob and a cover ring in a pull type structure according to one embodiment of the present invention, in a state before the cover ring is fitted onto a lower tubular portion of a core.
Figure 8B:
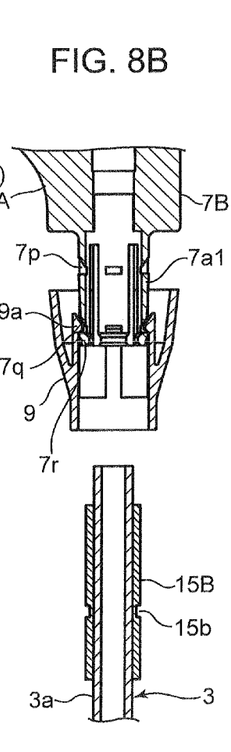
FIG. 8B illustrates the shift knob and the cover ring in the pull type structure, in a state just after the cover ring is fitted onto a lower tubular portion of a core, and temporarily snap-fitted to an intermediate locking recess.
Figure 8C:
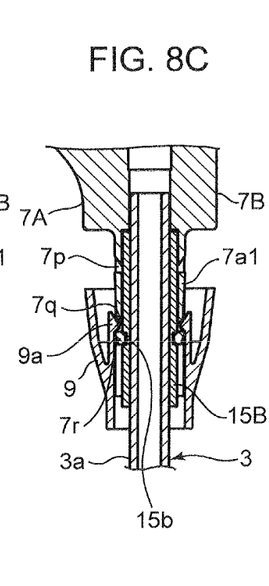
FIG. 8C illustrates a shift lever, the shift knob and the cover ring in the pull type structure, in a state just after the shift shaft of the shift lever is inserted into the lower tubular portion of the core, and snap-fitted to a lower locking protrusion.
Figure 8D:
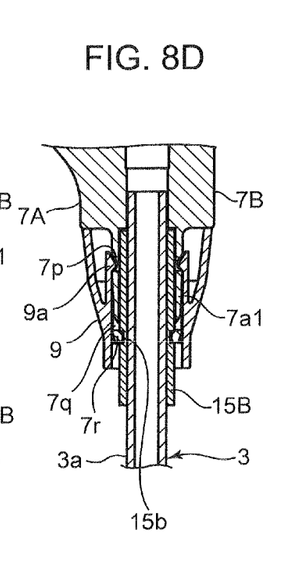
FIG. 8D illustrates the shift lever, the shift knob and the cover ring in the pull type structure, in a state after the cover ring is snap-fitted to an upper locking recess.
Figure 9A:
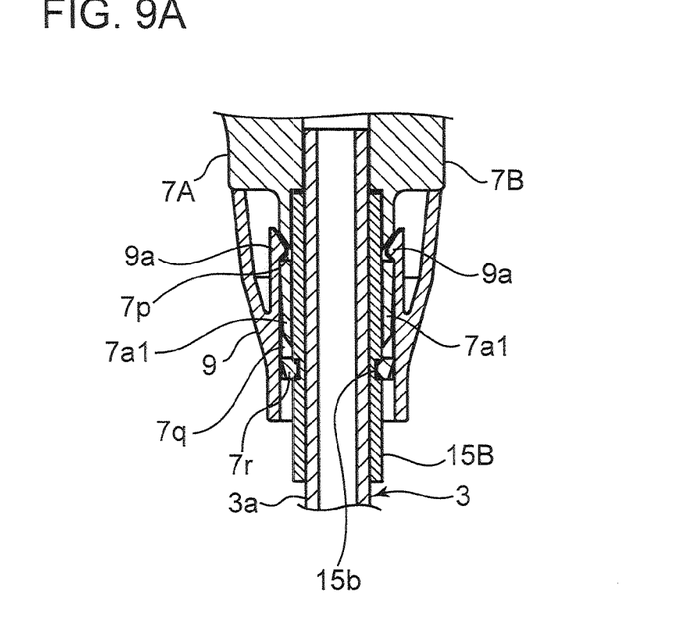
FIG. 9A is a fragmentary enlarged view of the structure in FIG. 8D.
Figure 9B:
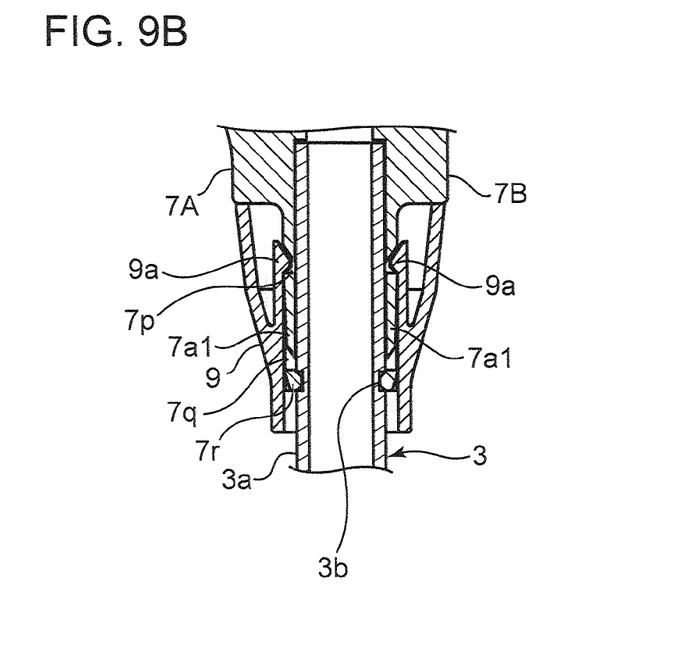
FIG. 9B is a fragmentary enlarged view of an example of modification of the structure in FIG. 9A.
Figure 10:
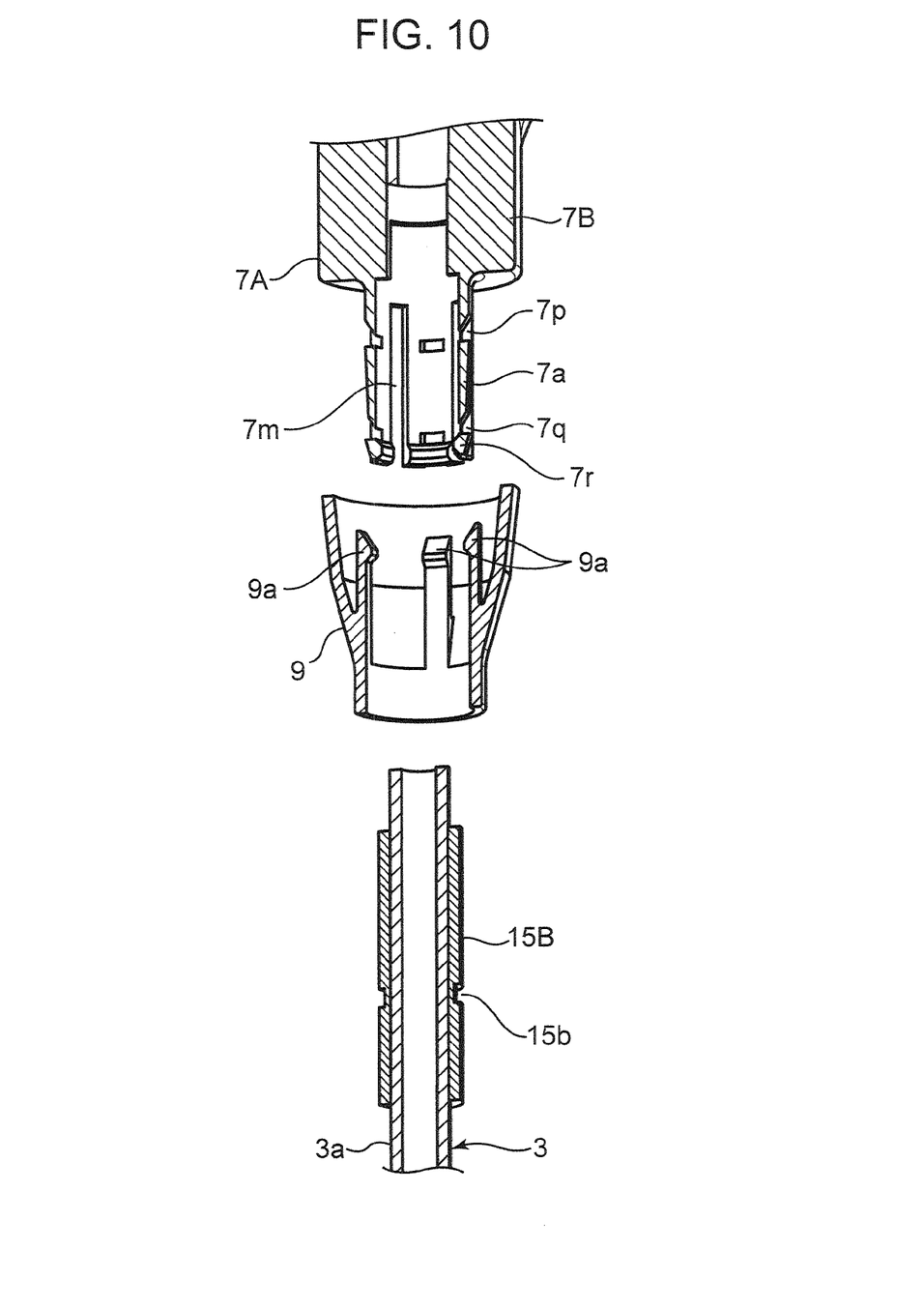
FIG. 10 is an exploded perspective sectional view of the shift knob, the cover ring and the shift shaft of the shift lever in the pull type structure.

FIG. 8A is a sectional view of a core 7 and a cover ring 9 in a state before the cover ring 9 is fitted onto a lower tubular portion 7a of the core 7. FIG. 8B is a sectional view of a shift shaft 3a of a shift lever 3, the core 7 and the cover ring 9 in a state just after the cover ring 9 is fitted onto the lower tubular portion 7a of the core 7, and temporarily retained by an intermediate locking recess. FIG. 8C is a sectional view of the shift shaft 3a, the core 7 and the cover ring 9 in a state just after the shift lever 3 is inserted into the lower tubular portion 7a of the core 7 and temporarily locked by a lower locking protrusion. FIG. 8D is a sectional view of the shift shaft 3a, the core 7 and the cover ring 9 in a state just after the cover ring 9 is snap-fitted into an upper locking recess. FIG. 9A is a fragmentary enlarged view of the structure in FIG. 8D, and FIG. 9B is a fragmentary enlarged view of an example of modification of the structure in FIG. 9A. FIG. 10 is an exploded perspective sectional view of the shift knob, the cover ring and the shift lever.

As a feature different from those of the push type structure, the lower tubular portion 7a of the core 7 has a plurality of (in this embodiment, four) slits 7m formed at approximately even angular intervals (in the embodiment, at intervals of 90 degrees) in a circumferential direction, wherein each of the slits 7m extends from an lower end to a position close to an upper end of the lower tubular portion 7a. Further, a plurality of sets of upper, intermediate and lower, three, locking elements 7p, 7q, 7r are formed, respectively, in a plurality of regions of the lower tubular portion 7a divided by the slits 7m, in a symmetrical manner with respect to an axis of the lower tubular portion 7a. Each of the upper locking elements 7p and the intermediate locking elements 7q is a locking recess (or locking hole), and each of the lower locking elements 7r is an inwardly-oriented locking protrusion. Each of the regions of the lower tubular portion 7a divided by the slits 7m produces elasticity which allows a respective one of the lower locking elements 7r to be displaced inwardly.

Correspondingly, the cover ring 9 is formed a plurality of locking protrusions 9a each configured to be temporarily retained by a respective one of the intermediate locking recesses 7q when the cover ring 9 is fitted onto the outer periphery of the lower tubular portion 7a of the core 7 from therebelow. Each of the locking protrusions 9a extends upwardly from a lower portion of the cover ring 9, and has a pawl formed at an upper end thereof. A coupling of each of the lockable protrusions 9a to a corresponding one of the locking recesses 7q is achieved in a snap fit manner.

The shift lever 3 is formed with a lockable recess 15b configured to be locked by the lower locking protrusions 7r when the shift shaft 3a is fitted into an inside of the lower tubular portion 7a of the core 7. A coupling of each of the locking protrusions 7r to the lockable recess 15b is achieved in a snap fit manner. In place of the lockable recess 15b, a lockable hole may be formed.

The shift shaft 3a of the shift lever 3 is made of a metal, and a synthetic resin sleeve 15B is integrally formed on an upper portion of the metal shift shaft 3a by an outsert molding process. The lockable recess 15b is formed in the sleeve 15B. The lockable recess 15b is configured to be locked by the lower locking protrusions 7r of the lower tubular portion 7a of the core 7 assembled into a cylindrical shape. A coupling of each of the locking protrusions 7r to the lockable recess 15b is achieved in a snap fit manner. It is to be understood that each of the locking elements 7p, 7q, 7r of the core 7, the lockable protrusions 9a of the cover ring 9 and the lockable recess 15b of the shift lever 3 is not limited to the above configuration in which four elements are provided at intervals of 90 degrees. For example, two elements may be formed at intervals of 180 degrees, or three elements may be may be formed at intervals of 120 degrees. Alternatively, five elements may be formed at intervals of 72 degrees, or six or more elements may be formed at given intervals.

After the lockable recess 15b of the sleeve 15B of the shift lever 3 is locked by the lower locking protrusions 7r, the cover ring 9 is moved upwardly. Through this operation, the lockable protrusions 9a of the cover ring 9 are rocked, respectively, by the upper locking recesses 7p. In this way, the cover ring 9 is locked by the lower tubular portion 7a.

In this structure, the cover ring 9 is fitted onto the lower tubular portion 7a of the core 7 from therebelow. Through this operation, the lockable protrusions 9a of the cover ring 9 are temporarily locked (temporarily retained), respectively, by the intermediate locking recesses 7q of the lower tubular portion 7a of the core 7. A coupling during this operation is achieved in a snap fit manner. That is, the cover ring 9 is retained in a state in which it can be further moved upwardly.

Further, the shift shaft 3a of the shift lever 3 is inserted into the inside of the lower tubular portion 7a of the core 7 from therebelow. Through this operation, the lockable recess 15b of the sleeve 15B of the shift lever 3 is locked by the lower locking protrusions 7r of the lower tubular portion 7a of the core 7. A coupling during this operation is achieved in a snap fit manner.

Then, when the cover ring 9 is further moved upwardly, the lockable protrusions 9a of the cover ring 9 are locked, respectively, by the upper locking recesses 7p of the lower tubular portion 7a of the core 7. A coupling during this operation is also achieved in a snap fit manner. The cover ring 9 is maintained in this state.

Thus, a shift knob installation process is based on a fitting operation to be performed from one direction (up-down direction), wherein the shift knob 1 can be attached to the shift shaft 3a of the shift lever 3 in a one-touch manner. Thus, it becomes possible to reduce a process time.

Further, the number of components can also be reduced, because it is possible to eliminate a need for a separate component, such as a pin, for attaching the shift knob 1 to the shift shaft 3a of the shift lever 3.

In the pull type structure illustrated in FIGS. 8A to 10, the synthetic resin sleeve 15B is integrally formed on the outer periphery of the upper portion of the metal shift shaft 3a of the shift lever 3 by an outsert molding process. Then, the lockable recess 15b (or lockable hole) is formed in the sleeve 15B. This gives rise to a question "Is it impossible to reduce the number of components (due to the sleeve 15B)?" However, the shift lever 3 is integrally formed with a synthetic resin support portion (see FIG. 2) 18 by an outsert molding process. The support portion 18 also serves as a swingable portion for allowing the shift lever 3 to be manually moved in front-rear and right-left directions. Therefore, by utilizing a step of outsert-molding the support portion 18, the synthetic resin sleeve 15A may be integrally outsert-molded in a simultaneous manner. This makes it possible to reduce the number of components.

In the pull type structure illustrated in FIGS. 8A to 10, the synthetic resin sleeve 15B is integrally formed on the outer periphery of the upper portion of the metal shift shaft 3a of the shift lever 3 by an outsert molding process, and the lockable recess 15b is formed in the sleeve 15B.

Differently, as illustrated in FIG. 9B, a lockable recess (or lockable hole) 3b may be directly formed in the metal shift shaft 3a of the shift lever 3. In this case, when the shift shaft 3a of the shift lever 3 is inserted into the inside of the lower tubular portion 7a of the core 7 from therebelow, the lower locking protrusions 7r of the lower tubular portion 7a of the core 7 are locked to the lockable recess 3b of the shift lever 3. In this operation, a coupling of each of the locking protrusions 7r to the lockable recess 3b is achieved in a snap fit manner.

In the above embodiments, a locking element (recess or protrusion) and a lockable element (protrusion or recess) are formed in one, first, component and the other, second, component, respectively. Alternatively, a lockable element (protrusion or recess) and a locking element (recess or protrusion) may be formed in the first component and the second component, respectively.

The above embodiments will be outlined below.

(1) The above embodiments disclose a button structure of a shift knob for use with a shift lever in which a rod is provided in an upwardly and downwardly movable manner. The button structure is characterized in that the shift knob comprises: a button capable of being manually pushed while being supported in a swingable manner, to allow the rod to be moved downwardly from a lock position to a lock release position; a pinion gear provided in coaxial relation to a pivot shaft of the button; and a rack meshed with the pinion gear, wherein the button structure is configured to move the rod to a shift-lock release position, interlockingly with a downward movement of the rack caused by a swinging movement of the pinion gear in a forward direction, according to a pushing operation of the button, and to move the rod to a shift-lock position, interlockingly with an upward movement of the rack caused by a swinging movement of the pinion gear in a reverse direction, according to a push-mode releasing operation of the button.

In the above embodiments, the rod is moved to a shift-lock release position, interlockingly with a downward movement of the rack meshed with the pinion, caused by a swinging movement of the pinion gear in a forward direction, according to a pushing (swingingly moving) operation of the button. Thus, the pinion gear and the rack make it possible to reduce a transmission loss of load from the pushing operation of the button. This allows the pushing operation of the button to be performed lightly and smoothly. Therefore, operational burden on an operator or driver can be reduced.

(2) The button structure may comprise a button base installed inside the shift knob. The button base may support the pivot shaft of the button, and the rack in an upwardly and downwardly movable manner, in a state in which a lower end of the rack is in contact with an upper end of the rod. The pivot shaft may be provided with a coil spring wound therearound to bias the button in a push-mode releasing direction or a pushing direction.

According to this feature, the button with the pinion gear, the pivot shaft, the coil spring and the rack can be preliminarily installed in the button base and adjusted. Then, this pre-installed unit can be simply installed in the shift knob, so that it becomes possible to enhance installation performance.

(3) The shift knob may comprise: a pair of half-cores assembled together while clamping the button base from opposed lateral directions, thereby installing therein the button base; an ornament attached to an upper side of the assembled half-cores in a snap fit manner, to cover the upper side of the assembled half-cores; and a cover ring attached to a lower tubular portion of the assembled half-cores in a snap fit manner, to cover the lower tubular portion of the assembled half-cores. The lower tubular portion of the assembled half-cores may be locked by the shift lever in a snap fit manner.

According to this feature, the pair of half-cores are assembled together while clamping the button base from opposed lateral directions, to install the button base inside the assembled half-cores. Then, the ornament is attached to the upper side of the assembled half-cores in a nap fit manner. Through this operation, the upper side of the assembled half-cores is covered. Then, the cover ring is attached to the lower tubular portion of the assembled half-cores in a snap fit manner. Through this operation, the lower tubular portion of the assembled half-cores is covered. Subsequently, the lower tubular portion of the assembled half-cores is attached to the shift lever in a snap fit manner. In this way, the shift knob can be installed to the shift lever. Thus, the shift knob can be installed in a one-touch manner by an installation operation to be performed from one direction, so that it becomes possible to enhance the installation performance of the shift knob.

This application is based on Japanese Patent application No. 2012-252462 filed in Japan Patent Office on Nov. 16, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A shift knob to be provided on a top portion of a shift lever in which a rod is provided in an upwardly and downwardly movable manner and is urged upward by an urging member, comprising:
    a support member configured to be attached fixedly to the top portion of the shift lever;
    a rack movably supported on the support member and contacting a top of the rod;
    a pinion gear swingably supported on a pivot of the support member, the pinion gear having teeth meshable with teeth formed on the rack; and
    a button swingably supported on the pivot of the support member and coming into contact with the pinion gear, the button receiving an urging force of the urging member and being swingable together with the pinion gear against the urging force of the urging member due to a pushing force thereon to move the rod downward due to movement of the rack to change the rod from a lock position to a lock release position.

2. The shift knob as defined in claim 1, wherein
    the supporting member supports the pivot shaft of the button, and has a button base that supports the rack in an upwardly and downwardly movable manner, and
    the pivot shaft is provided with a coil spring wound therearound to bias the button in a push-mode releasing direction or a pushing direction.

3. The shift knob as defined in claim 2, wherein the support member further comprises:
    a pair of half-cores assembled together while clamping the button base from opposed lateral directions, thereby installing therein the button base;
    an ornament attached to an upper side of the assembled half-cores in a snap fit manner, to cover the upper side of the assembled half-cores; and
    a cover ring attached to a lower tubular portion of the assembled half-cores in a snap fit manner, to cover the lower tubular portion of the assembled half-cores,
    and wherein the lower tubular portion of the assembled half-cores is locked by the shift lever in a snap fit manner.

* * * * *